United States Patent

[11] 3,594,069

| [72] | Inventor | Warren L. Harvey<br>P. O. Box 622 W. Main St., Mendham, N.J. 07945 |
|---|---|---|
| [21] | Appl. No. | 800,095 |
| [22] | Filed | Feb. 18, 1969 |
| [45] | Patented | July 20, 1971 |

[54] INTEGRAL REAR VIEW MIRROR FACE SHIELD
1 Claim, 3 Drawing Figs.

[52] U.S. Cl. .................................................. 350/298, 2/10
[51] Int. Cl. .................................................. G02b 7/18
[50] Field of Search ...................................... 2/14, 14.1, 10, 8, 9, 14.2, 14.9, 14.21, 14.2, 14.3; 351/50, 298

[56] References Cited
UNITED STATES PATENTS

| 2,176,167 | 10/1939 | Comstock | 351/50 |
| 3,205,303 | 9/1965 | Bradley | 350/298 X |
| 999,630 | 8/1911 | Collier | 2/14 (.1) |
| 1,504,344 | 8/1924 | Hennigh | 2/10 UX |
| 3,214,768 | 11/1965 | Bohner | 2/10 |
| 3,423,150 | 1/1969 | Freed | 2/14 |

FOREIGN PATENTS

| 1,447,792 | 6/1966 | France | 350/298 |
| 26,149 | 0/1904 | Great Britain | 2/10 |

*Primary Examiner*—H. Hampton Hunter

ABSTRACT: A one piece rear view mirror face shield as used with a protective helmet. The mirrored surface is positioned below the eye level of the user and is substantially the same width as the face shield permitting a practical focal length within a relatively clean aerodynamic and compact configuration by utilizing a rearward line of sight below the maximum width of the protective helmet.

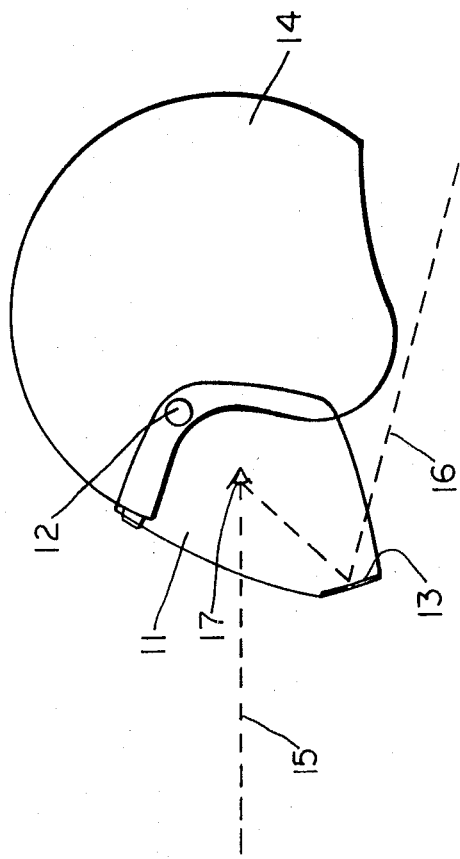
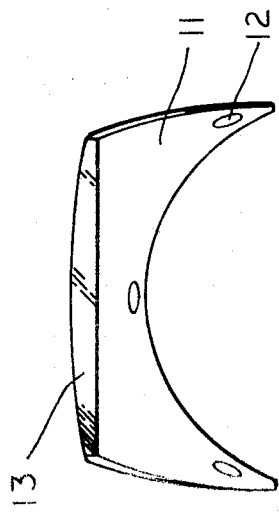
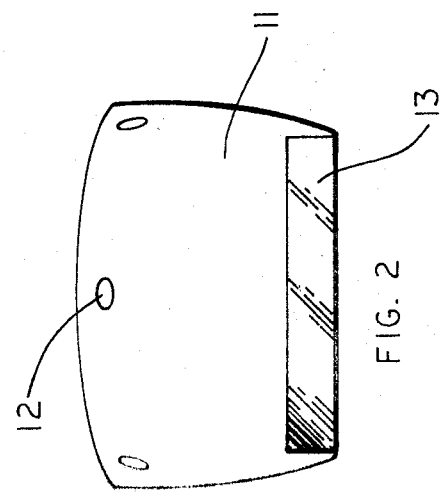

INTEGRAL REAR VIEW MIRROR FACE SHIELD

This invention relates in general to protective face shields and more particularly to an integral rear view mirror face shield combination as used in conjunction with a protective helmet used by a motorcyclist.

Desirable features of an integral rear view mirror face shield are adequate rear view capabilities, a focal length from the users eye to the mirror surface of sufficient dimension as to prevent eye strain resulting from change in focus between forward and rearward viewing, and a degree of compactness for aerodynamic and esthetic reasons.

Obvious combinations of a rear view mirror and face shield place the mirrored surface to the sides or above the user's eyes in order to avoid blocking his forward view. To locate the mirrored surface in this manner at a practical focal length results in a cumbersome configuration. In the present invention a mirrored surface is positioned on the face shield below eye level thereby blocking an insignificant area of forward vision. This position is necessary in providing the unique rearward line of sight imposed by an object of the invention.

Accordingly, an object of the invention is an integral rear view mirror face shield which results in the attainment of the above desirable features within the bounds of a relatively clean aerodynamic and compact configuration. Other objects and advantages will become more apparent from the following description taken in conjunction with the accompanying drawings wherein:

FIG. 1 is a top view.

FIG. 2 is an elevation view showing the inside surface.

FIG. 3 is a side view of the invention as affixed to a protective helmet with a relative eye location, eye level, and line of sight using the mirrored surface shown.

With reference to the drawings said invention comprises in general a transparent protective face shield 11. A plurality of fasteners 12 and a mirrored surface 13 are affixed to said protective face shield 11. In use said invention is fastened to a standard protective helmet 14 by means of said fasteners 12 whereby said mirrored surface 13 is situated in a position below the relative eye level 15 of the user thereby blocking an area of forward vision which under examination is found to be insignificant from a safety standpoint. Said area of blocked vision is comparable to the area of forward vision blocked by the dashboard in an automobile.

Utilization of said position permits the rearward line of sight 16 to be aimed at the level of said user's neck which is the minimum width obstruction thereby permitting the horizontal dimension of said mirrored surface 13 to be reduced to a minimum. In practice, the horizontal dimension of said mirrored surface 13 need not exceed the width of said protective helmet 14 thereby eliminating a need for increasing the frontal area over that of said protective helmet 14. Said rearward line of sight 16 is controlled or aimed by coordinated head and eye movement. Areas which are obstructed by said user's neck and said protective helmet 14 come into view when said user turns his head appropriately.

Additionally, utilization of said position permits the focal length between said mirrored surface 13 and the relative eye location 17 to be increased, in order to reduce severe change in focus between forward and rearward viewing, by increasing the dimension of said invention in a direction parallel to the major direction of airflow whereby there is no increase in said frontal area.

What I claim is:

1. A one piece rear view mirror face shield comprising a transparent face shield of sufficient length to substantially cover the face of the wearer, fastener means to affix said face shield to a protective helmet, and an elongated, horizontally extending mirrored surface affixed to the inner surface of said face shield below the eye level of the user when said face shield is used in conjunction with a protective helmet, the horizontal width of said mirrored surface being substantially greater than the vertical height of the same and substantially equal to the horizontal width of said face shield.